United States Patent
Byrns et al.

(10) Patent No.: US 8,565,960 B2
(45) Date of Patent: Oct. 22, 2013

(54) MODULAR SYSTEM FOR SERVICEABLE VEHICLE COMPONENTS

(75) Inventors: Patric Byrns, Saskatoon (CA); Chris Chahley, Saskatoon (CA)

(73) Assignee: 101070291 Saskatchewan Ltd., Saskatchewan (CA)

( * ) Notice: Subject to any disclaimer, the term of this patent is extended or adjusted under 35 U.S.C. 154(b) by 0 days.

(21) Appl. No.: 13/451,780

(22) Filed: Apr. 20, 2012

(65) Prior Publication Data
US 2012/0271505 A1    Oct. 25, 2012

(51) Int. Cl.
*B23P 19/00* (2006.01)
(52) U.S. Cl.
USPC ............................. 701/29.1; 29/402.08
(58) Field of Classification Search
USPC ................... 29/402.08; 180/65.1; 701/29.1
See application file for complete search history.

(56) References Cited

U.S. PATENT DOCUMENTS

2008/0017426 A1*  1/2008  Walters et al. ............... 180/65.2

* cited by examiner

*Primary Examiner* — Mary Cheung
*Assistant Examiner* — Yuen Wong
(74) *Attorney, Agent, or Firm* — Sheridan Ross P.C.

(57) ABSTRACT

The invention seeks to provide a system of modular component clusters for use with vehicles such as electric utility vehicles, allowing for rapid and straightforward field repair. Vehicle components are arranged within cluster modules, the modules being releasably and operably connectable to the vehicle and adapted to provide for easy diagnosis of component failures. The cluster modules are designed to be independently exchanged in and out of the vehicle should any single component in a cluster fail, without the need for onsite service. Removal and replacement of a cluster module requires only minimal mechanical skill and the faulty module can then be out-shopped for repair. The system provides for more simplified maintenance of vehicles where moving the entire vehicle to a service location might be impractical.

20 Claims, 6 Drawing Sheets

MODULAR SYSTEM FOR SERVICEABLE VEHICLE COMPONENTS

CROSS-REFERENCE TO RELATED APPLICATIONS

This application claims the benefit of Canadian Patent Application No. 2,737,705 and Canadian Patent Application No. 2,740,518, filed Apr. 21, 2011 and May 17, 2011, respectively, the entire disclosures of which are incorporated by reference herein.

FIELD OF THE INVENTION

The invention relates to systems designs for vehicles, and in particular arrangements of critical system components.

BACKGROUND OF THE INVENTION

Motorized vehicles have been used in a vast array of applications as a means of increasing productivity, generally by augmenting human abilities in terms of speed and/or strength. In addition, motorized vehicles have been designed for operation in various challenging work environments, such as in mine shafts thousands of feet below the surface, and can isolate personnel to varying degrees from dangerous conditions.

Use of vehicles in confined or remote spaces, such as in the mining context, creates a particular set of safety and logistical issues which must be addressed in order to maximize the availability and use of suitable vehicles in such environments. For example, vehicle components can fail, even in ideal operational environments, either through normal wear or as a result of damage due to accident or unexpected component failure. If complex repairs are required in such a case that necessitate the availability of highly trained onsite repair staff, the attractiveness of using such vehicles is impaired despite the clear value of employing the equipment. In applications such as the mining industry, the vehicle may be in use at locations that are difficult if not impossible to access with the equipment needed for diagnosis or repair. Similarly, it may be impractical to move the vehicle from its operational location to a qualified repair facility. Further, specialized technicians needed to provide repairs may not be capable of effecting such repairs in the severe conditions that may be found in active mining operations, and indeed may not have the skills and training necessary in order to work safely and effectively in an active mining location.

In many cases mining machines are run by electrical power to obviate the need for combustion product removal from the mine, which would be necessary if gas or diesel engines were used in underground operations. Typically, higher voltage systems are used, and so repair personnel would also have to be trained in dealing with high voltage portions of systems, and not all electricians are trained to work on the kinds of electrical systems present in mining contexts.

Another issue that arises when a vehicle fails is that the vehicle will normally be out of service until such time as skilled technicians can diagnose and remedy the problem, as personnel operating the vehicle are often not trained in the repair of their equipment. In a remote, isolated operational location, it can be difficult and time-consuming to retain the necessary repair services. Having a vehicle out of service for any extended period of time can be costly, and this would be exacerbated by the isolated operational location. Further, depending on the complexity of the machine, it may be difficult to diagnose or remedy the fault without access to specialized equipment that may not be accessible in a remote location. Even if skilled personnel and specialized equipment are available and can access the work environment, the cost of retaining such services may be prohibitive.

Finally, it may not be practical for an individual company to maintain a staff of specialized technicians able to repair every component of their machinery. Many companies routinely depend on service from outside contractors, who can justify the expense of technicians and specialized equipment by servicing multiple customers.

As a result, there is a clear need for a solution that provides for cost-effective vehicle component repair, while reducing equipment downtime. The solution must respect the fact that equipment is sometimes deployed in challenging environments and traditional repair strategies are accordingly inadequate, and the personnel working in such environments are generally unable to effect the necessary repairs themselves. A system which would allow for the quick onsite repair of vehicles such as utility vehicles, without requiring specialized onsite staff or tools. would be beneficial to many vehicle users in numerous industries.

SUMMARY OF THE INVENTION

The present invention therefore seeks to provide a system of modular component clusters for use with vehicles such as electric utility vehicles, allowing for rapid and straightforward field repair. Vehicle components are arranged within cluster modules, the modules being releasably and operably connectable to the vehicle and adapted to provide for easy diagnosis of component failures. The cluster modules are designed to be independently exchanged in and out of the vehicle should any single component in a cluster fail, without the need for onsite service.

The present invention also seeks to provide a system whereby individual cluster modules can be independently swapped out of the vehicle if a component fails within that cluster module, without requiring a user to first identify which component has failed. The system is further configured to advise a user in which cluster module the failed component resides, such that cluster modules do not have to be removed and replaced by trial and error in order to correct a defect in one or more of the components. The overall advantage is that a user does not need to be skilled in specific component diagnosis and repair techniques in order to maintain the vehicle in service.

Using this system, vehicles, especially those in challenging environments like mines, can be maintained in service efficiently without the need for skilled onsite repair personnel, while minimizing the amount of downtime in the event of component failure. The defective module could be easily replaced by a new or remanufactured one such that the vehicle could be back in operation within a relatively short period of time, reducing the economic cost of an equipment failure. Conveniently, the defective module could be sent to a specialized facility either to be repaired, or a replacement module purchased. Operators could keep in stock at least one replacement module such that parts would be readily available, again to minimize the downtime when parts fail.

According to a first aspect of the present invention there is provided a vehicle comprising at least two modular functional clusters, each of the at least two clusters releasably and operably connected to the vehicle and independently detachable from the vehicle, each of the at least two clusters comprising at least one component, wherein upon failure of one component the cluster containing the failed component can be detached from the vehicle for servicing and a replacement cluster subsequently releasably and operably connected to the vehicle.

According to a second aspect of the present invention there is provided a method for repairing a vehicle, the vehicle comprising at least two modular functional clusters releasably and operably connected to the vehicle and independently detachable from the vehicle, each of the at least two clusters comprising at least one component, at least one of the components having experienced failure, the method comprising:
 a. detecting failure of the failed component;
 b. detaching the cluster containing the failed component from the vehicle; and
 c. attaching a replacement cluster to the vehicle.

According to a third aspect of the present invention there is provided a modular system for use with a vehicle, the system comprising at least two modular functional clusters, each of the at least two clusters releasably and operably connected to the vehicle and independently detachable from the vehicle, each of the at least two clusters comprising at least one component, wherein upon failure of one component the cluster containing the failed component can be detached from the vehicle for servicing and a replacement cluster subsequently releasably and operably connected to the vehicle.

In exemplary embodiments of the present invention, a diagnostic module is preferably provided and configured to communicate with the at least two clusters, by means of a wired or wireless connection, for analysing the components of the at least two clusters and detecting a failure within one of the at least two clusters. Where a wired connection is employed, this would preferably take the form of a wiring harness, and most preferably would incorporate sealed, quick-release connectors to facilitate simple and rapid duster exchanges. Where a wireless connection is employed, the diagnostic module and the at least two clusters are preferably provided with transceivers. It is also preferable that embodiments of the invention include a diagnostic display configured to display a notification of the failure detected by the diagnostic module, which notification would indicate the cluster within which the failure occurred. The diagnostic display preferably comprises at least one indicator selected from the group consisting of lights, LEDs and digital displays. A data retention system may also be provided in exemplary embodiments for storing information on a machine-readable medium, the information capable of use in determining the service history of each cluster, which system may comprise a microprocessor and data storage means.

In exemplary embodiments of the present invention, the clusters may comprise a control box cluster, a battery box cluster, a dash box cluster, a motor cluster and a drive train cluster; such clusters may house primarily electrical components, particularly where the vehicle is powered by electricity. The control box cluster would preferably comprise such features as a controller, an AC/DC converter, main contactors, relays, a battery management system and a heat-sink; where a control box cluster is included, it could also house the diagnostic module. The battery box cluster would preferably comprise a series of battery cells. The dash box cluster would preferably comprise an instrument panel, a key switch, a forward/neutral/reverse control, a high/low control, a horn, an hour meter, and fuses; where a dash box cluster is included, it could also house the diagnostic display. The motor cluster would preferably comprise an electric motor and related ancillary components, and the drive train cluster would preferably comprise a transmission. A person skilled in the relevant art would know of other features that could be present in appropriate circumstances.

In some embodiments of the present invention it would also be preferable for the diagnostic module or control box cluster to incorporate sensors for detecting imminent failures that have not yet occurred. Such sensors could also be integrated with the diagnostic display for providing notification of the imminent failure.

A detailed description of an exemplary embodiment of the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention.

Preferred embodiments of the present invention will now be described with reference to the accompanying drawings.

DETAILED DESCRIPTION OF EXEMPLARY EMBODIMENTS

Figure 1:
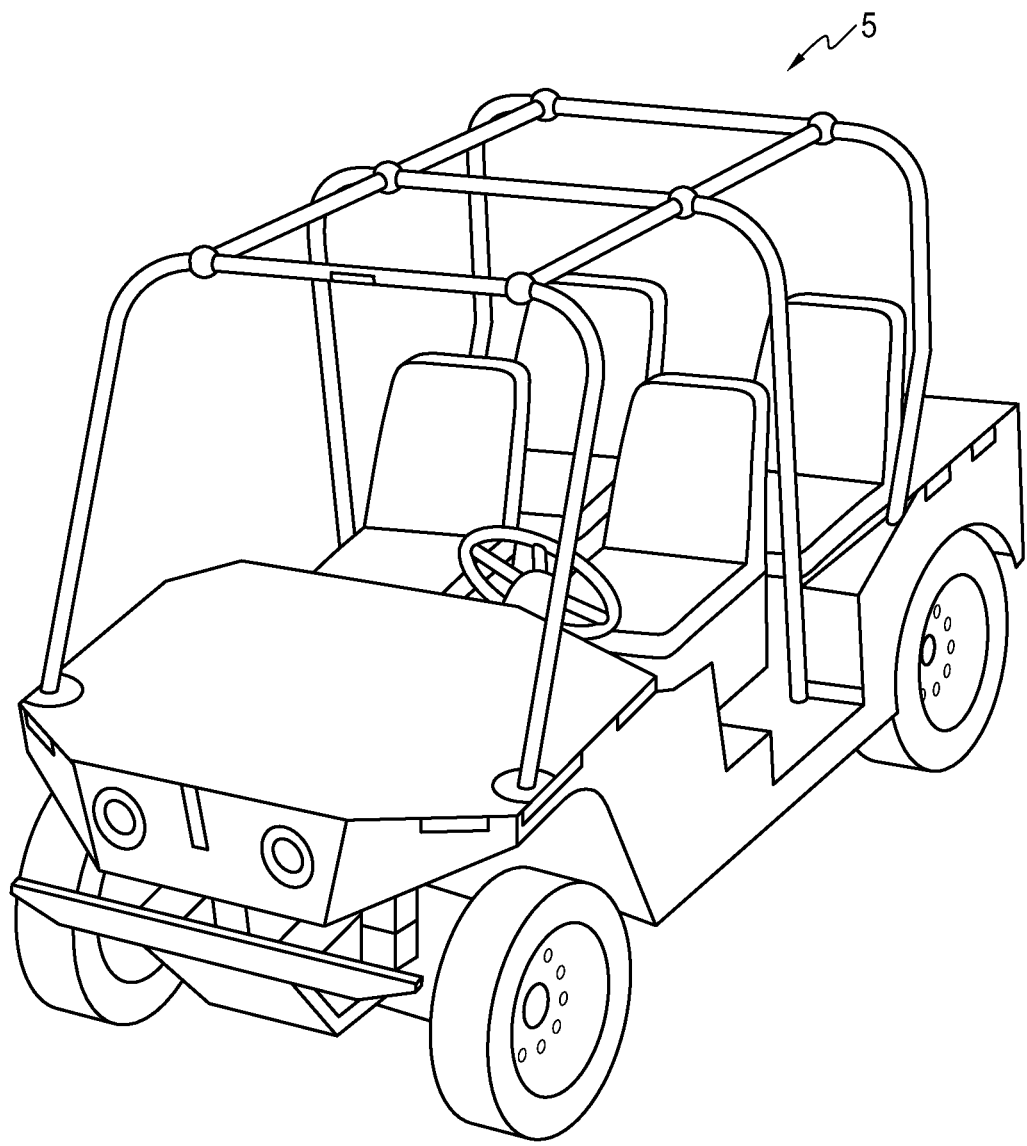
FIG. 1 is one embodiment of a vehicle in respect of which the present invention could be practiced, namely an electric utility vehicle.

FIG. 1 shows one embodiment of a vehicle 5 which could be used in an industrial application and in respect of which it is contemplated that the present invention could be practiced. The vehicle 5 as shown is an electric personnel vehicle. It will be understood that many different types of vehicles could be used with the present invention and that the vehicle shown is only intended as one illustrative embodiment of the type of vehicle in respect of which the present invention could be practiced.

In embodiments of the present invention, individual components may be clustered in one or more cluster modules. In preferred embodiments a single cluster module would comprise components having related functions. Each cluster module is adapted to be easily removed from or connected to the vehicle. In the preferred embodiment of the present invention, the system is designed such that when a single component within a cluster module fails, the entire cluster module "fails". The system is further designed to inform a user as to which cluster module is not functioning so that it can be removed and replaced with a new or refurbished cluster module.

Referring to the embodiments of FIGS. 2, 4a, 4b and 5, the system comprises a control box cluster module 10, which itself comprises a controller 11, an AC/DC converter 12, main contactors 13, relays 14, a battery management system 15, and heat-sink 16. The control box cluster module 10 also preferably includes a diagnostic module 17a for detecting component failures in this and other cluster modules, although the diagnostic module 17a could also be designed as a standalone module.

In some embodiments, the control box cluster module 10 may further comprise a diagnostic display feature 17b including indicators such as lights, LEDs, or digital displays configured to inform the user regarding which of the cluster modules has experienced a failure; such a diagnostic display feature 17b may alternatively be incorporated into the dash box cluster module 30. In some cases, the control box cluster module 10 may include sensors 18 or other monitoring equipment known to those skilled in the art, to interrogate the status of all or some of the cluster modules in order to sense an impending failure before it occurs.

In some embodiments, the control box cluster module 10 may include data storage and analysis capability in the form of a microprocessor 19a and data storage means 19b in order to maintain a log of the various systems, the occurrence of failures, and the like. Having such a log would allow one to forecast the need for replacement cluster modules, and also to determine which replacement cluster modules may need to be stocked in greater numbers.

In some embodiments, the system may comprise additional cluster modules of components, adapted to communicate with the control box cluster module 10. For example, and with reference to FIGS. 2, 4a, 4b and 5, in some embodiments the system further comprises a battery box cluster module 20, comprising whatever battery technology is in use in a particular machine. In some cases the battery in this cluster module 20 may comprise a series of lithium ion cells 21, but other battery types are adaptable for use in the system and so the particular type of battery is not considered limiting to the scope of the invention.

In some embodiments, the system comprises a dash box cluster module 30. In the case of a mining vehicle, the dash box cluster module 30 can comprise an instrument panel 31, key switch 32, forward/neutral/reverse control 33, high/low control 34, horn 35, hour meter 36, fuses 37, and other like instrumentation (not shown) useful to the operator. As indicated above, the dash box cluster module 30 could also comprise the diagnostic display feature.

In some embodiments, the system comprises a motor cluster module 40. This can be the electric motor 41 used to drive the machine, as well as ancillary components 42 needed to integrate the motor into the electrical system of the machine.

In some embodiments, the system comprises a drive train cluster module 50. This can include the transmission 51 and other components 52 needed to transmit output from a motor to a drive system, for example wheels on the vehicle 5.

Figure 2:
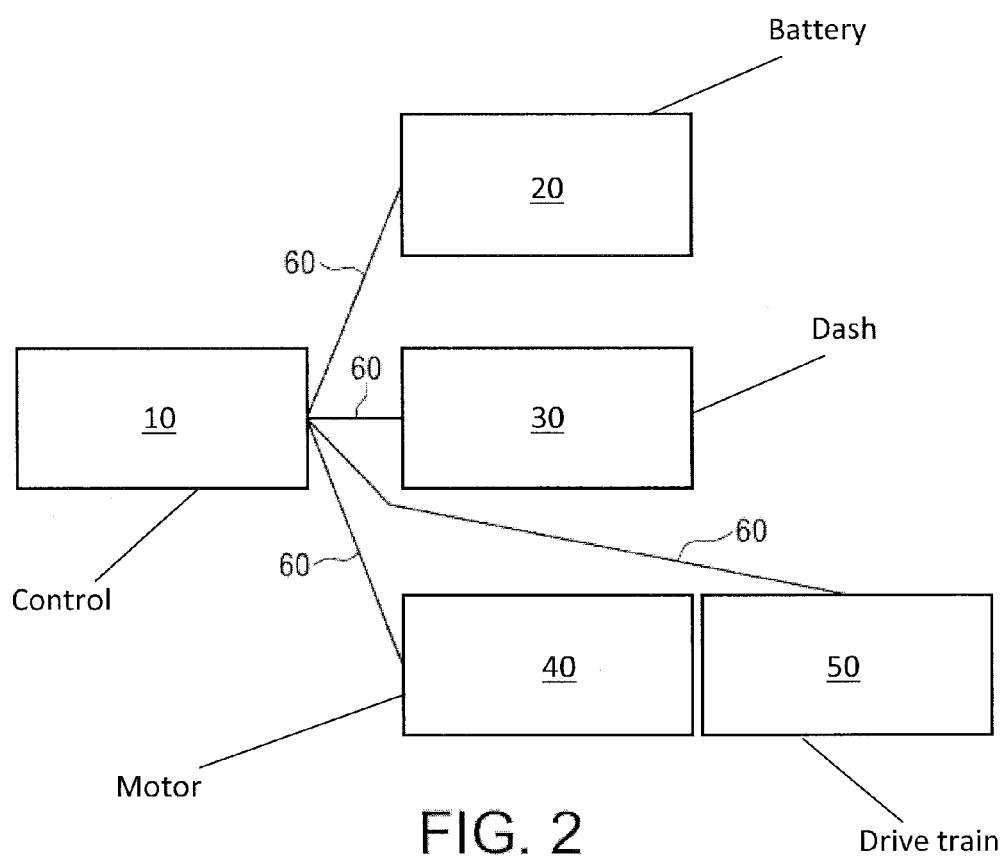
FIG. 2 is a schematic illustration of one embodiment of the invention comprising an arrangement of component cluster modules in a motorized vehicle.
Figure 4A:
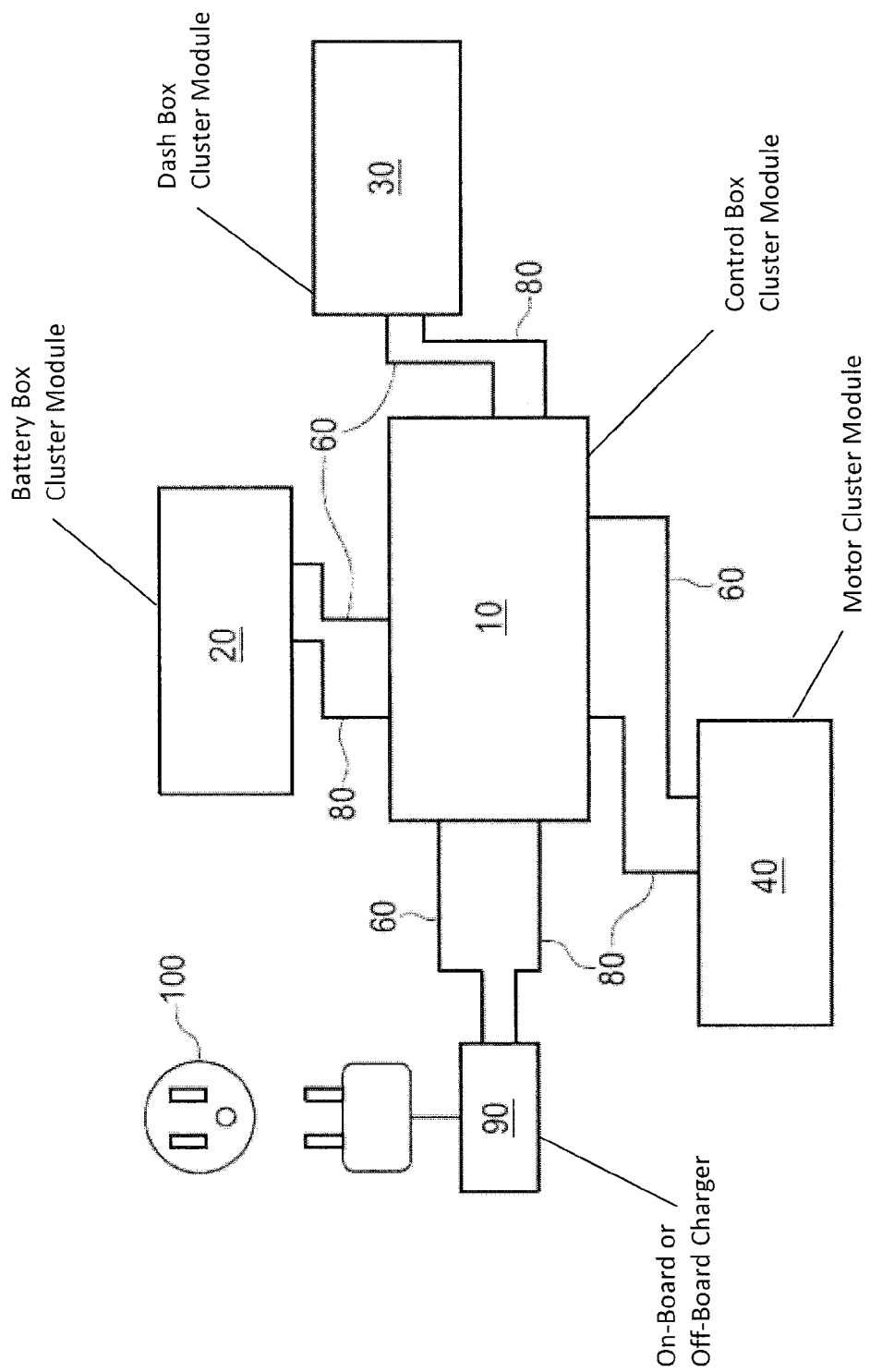
FIG. 4a is a schematic illustration of one embodiment of the invention comprising wired communication means between the modules.
Figure 4B:
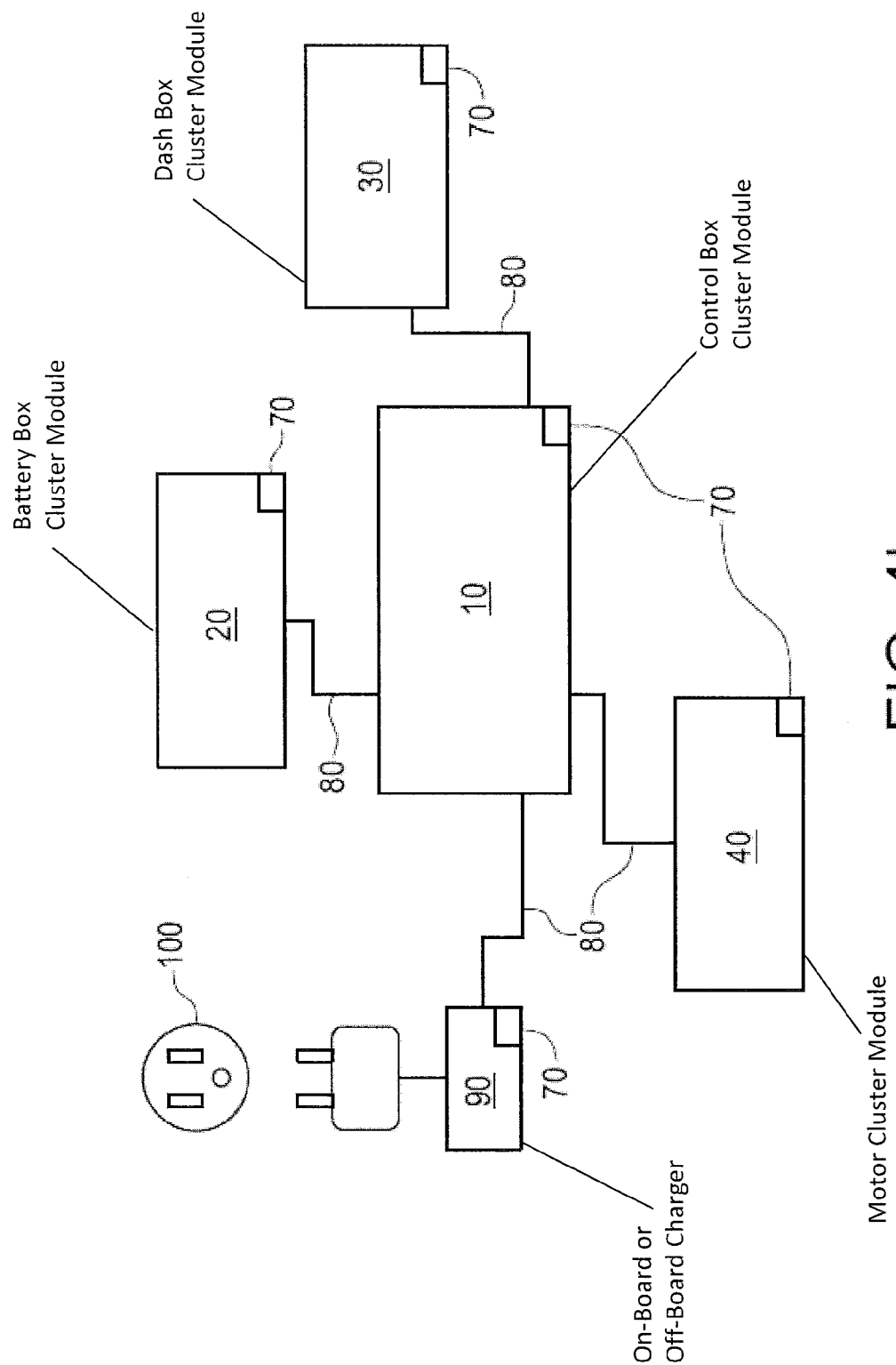
FIG. 4b is a schematic illustration of one embodiment of the invention comprising wireless communication means between the modules.
Figure 5:
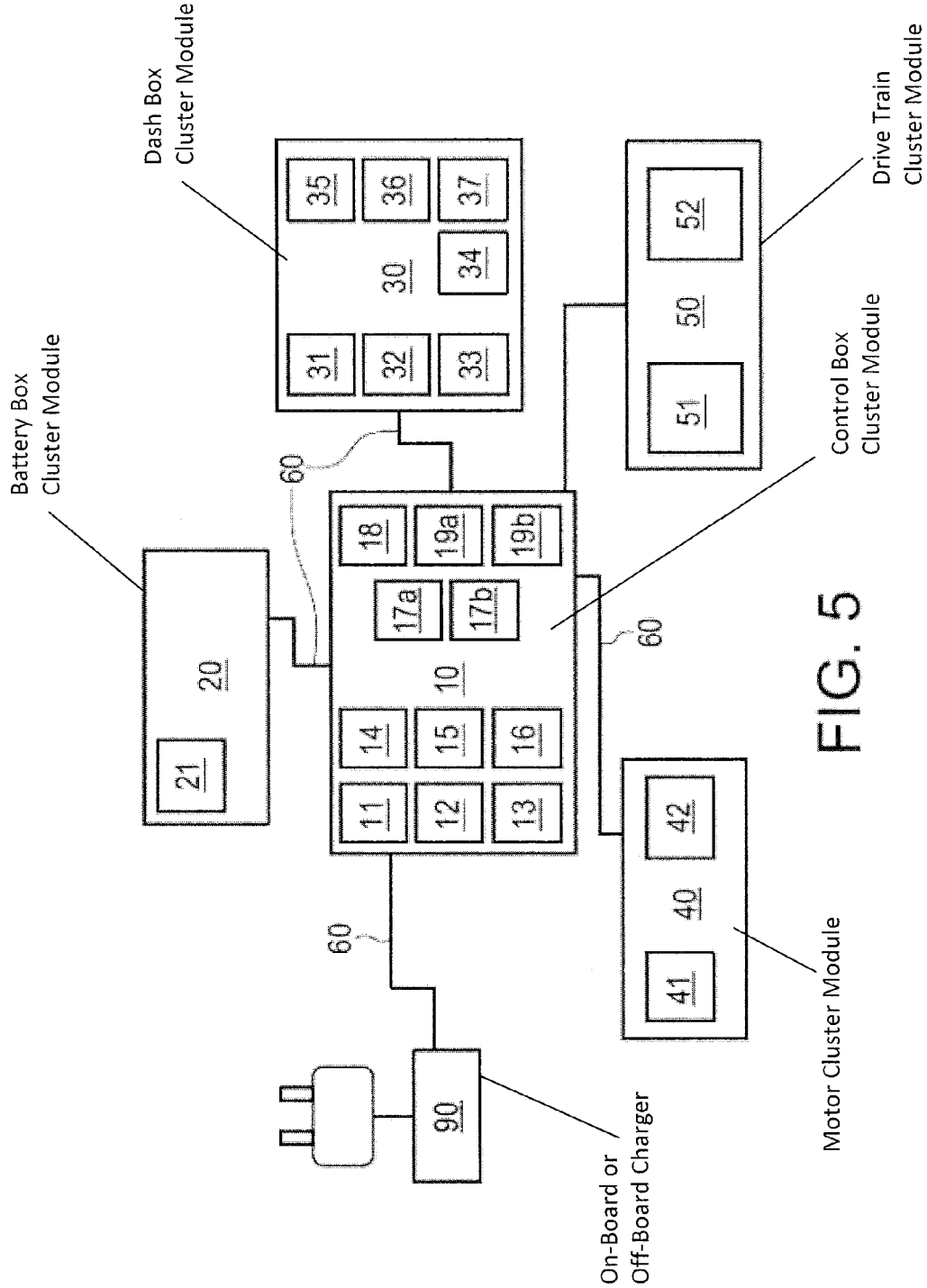
FIG. 5 is a schematic illustration of one embodiment of the invention showing components within modules.

In some embodiments, and with specific reference to FIGS. 2, 4a and 4b, the various cluster modules are integrated with the control box cluster module 10 by means of wiring harnesses 60 which may comprise sealed, quick-release connectors. Mechanical connection of the various cluster modules to the machine may be effected by typical fastener systems appropriate for that individual cluster module, as would be clear to one skilled in the art. The system therefore allows for removal and replacement of an individual cluster module by simply disconnecting the wiring harness 60 in order to remove the tailed cluster module from the machine. The new or refurbished cluster module is then installed in a like fashion.

Figure 3A:
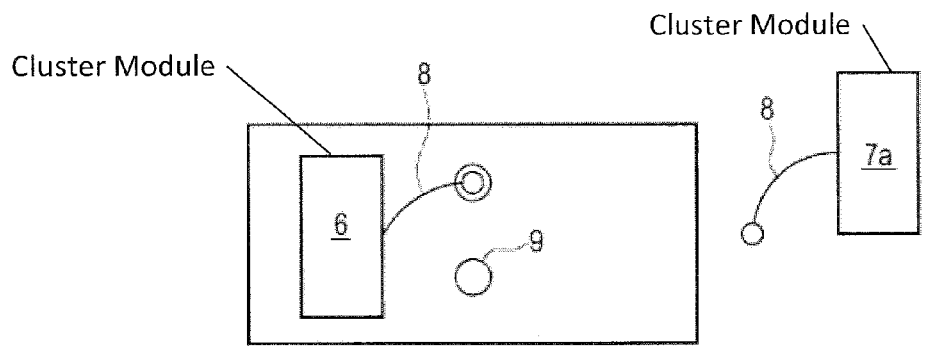
FIG. 3a is a schematic illustration of one embodiment of the invention comprising two cluster modules, showing the disconnection of a faulty module.
Figure 3B:
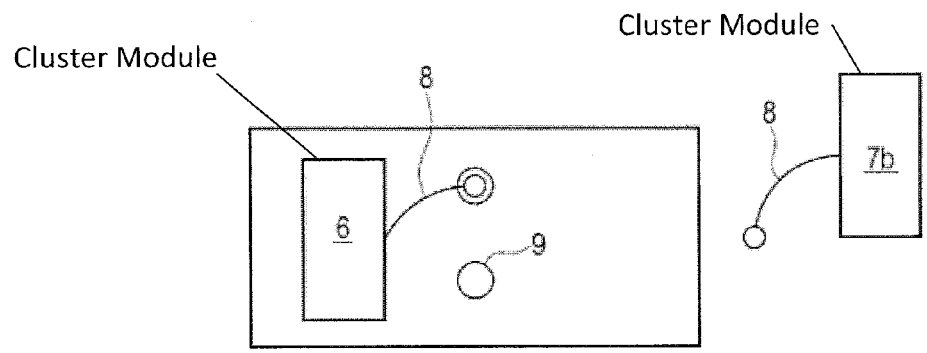
FIG. 3b is a schematic illustration of the embodiment of FIG. 3a, showing the exchange of modules.
Figure 3C:
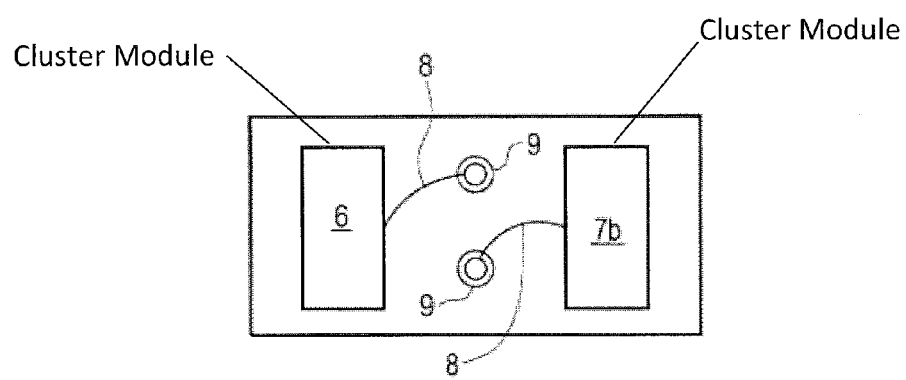
FIG. 3c is a schematic illustration of the embodiment of FIGS. 3a and 3b, showing the connection of a replacement module.

The simplicity of the repair method taught as part of the present invention is illustrated in FIGS. 3a, 3b and 3c. In a vehicle 5 (illustrated as a box for schematic purposes), there are provided two cluster modules 6 and 7a, each of which is connected to the vehicle 5 by a connector 8 at a connector dock 9. As indicated above, the various modules could also be connected to a control box module, but for the sake of simplicity the modules are illustrated as being connected to the vehicle 5 itself: While the first module 6 may be functioning properly, the second module 7a may experience a component failure; this failure would preferably be indicated to the operator as described above. While retaining the first module 6 in place, the operator would remove the failed second module 7a by disconnecting the connector 8 from the connector port 9 and setting the failed second module 7a aside for repair at a later time at an appropriate facility. The operator would then obtain a replacement module 7b, either from an on-site stock of replacement modules or through contacting an outside supplier, and attach it to the vehicle 5 by inserting the connector 8 to the connector port 9. In this way, the operator need have no technical expertise regarding the various components, but can simply switch out the failed module 7a for a corresponding and functionally equivalent module 7b and continue with the task enabled by the particular vehicle 5.

Referring again to FIGS. 4a and 4b, an electrical vehicle embodiment of the present invention is illustrated. In such an embodiment, electrical power is required to enable functioning of the various cluster modules. To this end, power lines 80 are provided to transfer power to the various modules. An AC power source 100 may be employed in appropriate circumstances, which would provide power to an on-board or off-board charger 90, and the power would then be transferred to the power lines 80. With regards to communication between the modules, such as communication of component failure information, this may be effected by wired or wireless means. In some cases communication may be through a wiring harness 60, such as a quick release harness, as is illustrated in FIG. 4a. In some cases, however, communication could be accomplished via a wireless device, as is illustrated in FIG. 4b, such that each cluster module and the control box cluster module 10 include transceivers 70 that can communicate status information between the control box cluster module 10 and the other duster modules. A wireless device could be useful in applications where repeated movements of the machine might fatigue wired connections between the control box cluster module 10 and any of the other cluster modules.

As can be readily seen, then, there are numerous advantages provided by the present invention. One advantage provided is that the operator, who is likely not an expert in the diagnosis or repair of the vehicle, can readily identify that a failure has occurred in a cluster module, in which cluster module the failure occurred, and then replace the failed cluster module such that the vehicle is back in service in a relatively short period of time, without having to first identify the specific component that has failed.

A further advantage is provided in that the system can be designed such that multiple failures in multiple cluster modules may be detected simultaneously. This allows a user to remove and replace those cluster modules with defective components, rather than having to resort to trial and error to determine where the failed component or components reside, a common problem when repairing electrical systems. In addition, minor failures such as failures in wiring harnesses will be reported as a cluster module failure as the cluster module will no longer be able to communicate with the control box cluster module if the integrity of the wiring harness between the control box and the other model has been compromised.

It should be remembered that while one embodiment of the system is useful in electric mining vehicles, it will be readily apparent to those skilled in the art of mechanical devices that the modular component system described herein is widely adaptable to machines other than simply mining vehicles. Those skilled in the art will readily recognize the interchangeability of various features and various embodiments. Thus, although the disclosure has been provided in the context of certain embodiments and examples, it will be understood by those skilled in the art that the disclosure extends beyond the specifically described embodiments to other alternative embodiments and or uses and obvious modifications and equivalents thereof.

Accordingly, the foregoing is considered as illustrative only of the principles of the invention. Thus, while certain aspects and embodiments of the disclosure have been described, these have been presented by way of example only and are not intended to limit the scope of the disclosure. Indeed, the novel methods and systems described herein may be embodied in a variety of other forms without departing from the spirit of the invention, which invention is defined solely by the claims below.

The invention claimed is:

1. A vehicle comprising at least two modular functional clusters, each of the at least two clusters releasably connected to the vehicle and independently detachable from the vehicle, each of the at least two clusters comprising at least one component, wherein upon failure of one component the cluster containing the failed component can be detached from the vehicle for servicing and a replacement cluster subsequently releasably connected to the vehicle; and wherein each of the at least two modular functional clusters comprises at least one of a control box cluster, a battery box cluster, a dash box cluster, a motor cluster, and a drive train cluster.

2. The vehicle of claim 1 further comprising a diagnostic module configured to communicate with the at least two clusters, the diagnostic module for analysing the components of the at least two clusters and detecting failure within one of the at least two clusters.

3. The vehicle of claim 2 wherein the diagnostic module is configured to communicate with the at least two clusters by means of a wired connection.

4. The vehicle of claim 2 wherein the diagnostic module is configured to communicate with the at least two clusters by means of a wireless connection.

5. The vehicle of claim 2 further comprising a diagnostic display configured to display a notification of the failure detected by the diagnostic module.

6. The vehicle of claim 1 further comprising a data retention system for storing information on a machine-readable medium, the information capable of use in determining the service history of each cluster.

7. The vehicle of claim 6 wherein the data retention system comprises a microprocessor and data storage means.

8. The vehicle of claim 1 wherein the components are electrical components necessary for the functioning of the vehicle.

9. The vehicle of claim 1 wherein the control box cluster comprises a controller, an AC/DC converter, main contactors, relays, a battery management system and a heat-sink.

10. The vehicle of claim 1 wherein the battery box cluster comprises a series of battery cells.

11. The vehicle of claim 1 wherein the dash box cluster comprises an instrument panel, a key switch, a forward/neutral/reverse control, a high/low control, a horn, an hour meter, and fuses.

12. The vehicle of claim 1 wherein the motor cluster comprises an electric motor and ancillary components.

13. The vehicle of claim 1 wherein the drive train cluster comprises a transmission.

14. The vehicle of claim 1 wherein the control box cluster comprises a diagnostic module configured to communicate with the other clusters, the diagnostic module for analysing the components of the other clusters and detecting failure within one of the other clusters.

15. The vehicle of claim 14 wherein the control box cluster further comprises a diagnostic display configured to display a notification of the failure detected by the diagnostic module.

16. The vehicle of claim 5 wherein the diagnostic display comprises at least one indicator selected from the group consisting of lights, LEDs and digital displays.

17. The vehicle of claim 1 wherein the control box cluster comprises sensors configured to detect imminent failures in the components.

18. The vehicle of claim 3 wherein the diagnostic module is connected to the at least two clusters by means of a wiring harness.

19. The vehicle of claim 18 wherein the wiring harness comprises sealed, quick-release connectors.

20. The vehicle of claim 4 wherein the diagnostic module and the at least two clusters are provided with transceivers to enable wireless communication between the diagnostic module and the at least two clusters.

* * * * *